Patented Oct. 13, 1925.

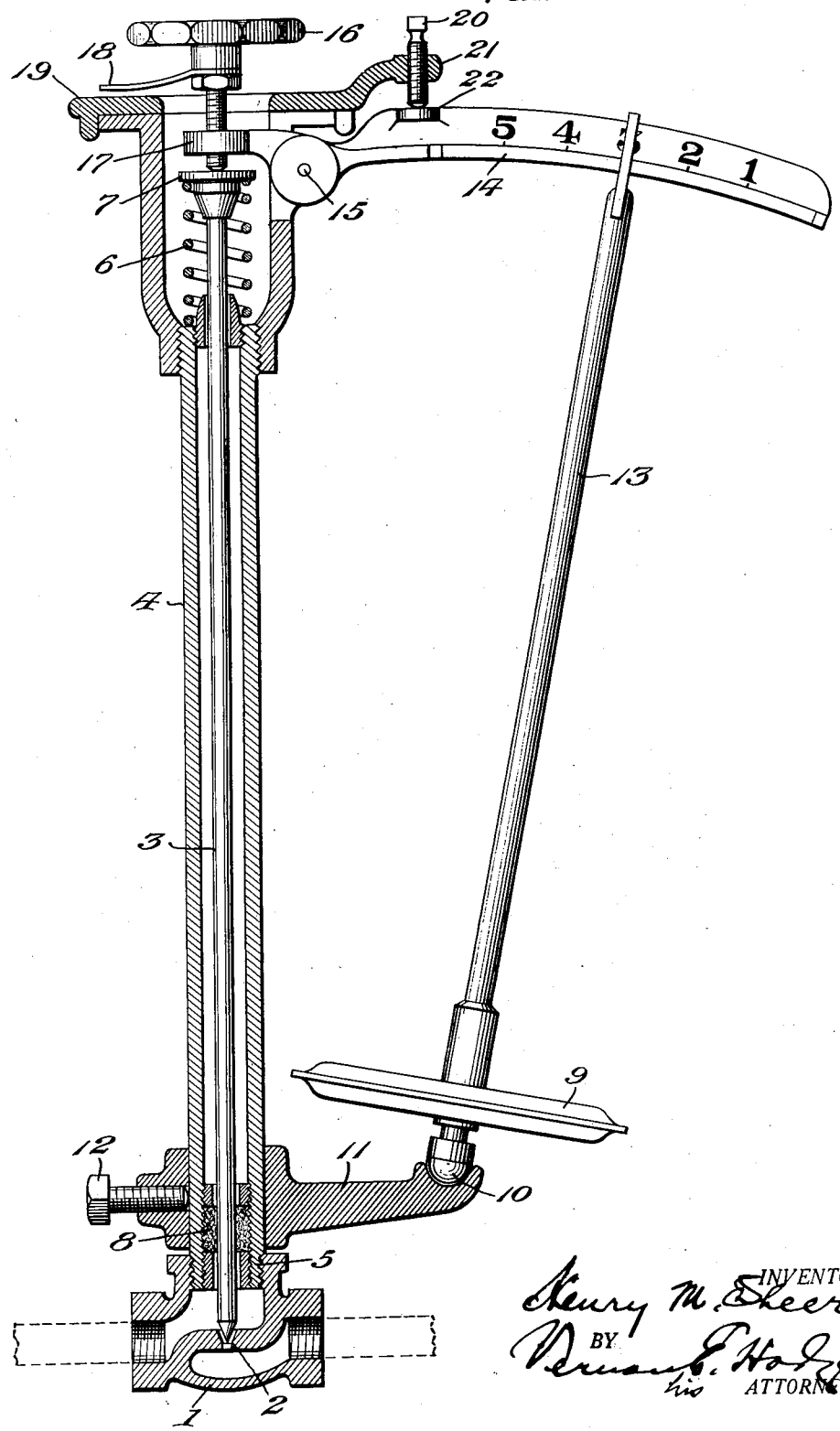

1,556,639

UNITED STATES PATENT OFFICE.

HENRY M. SHEER, OF QUINCY, ILLINOIS, ASSIGNOR TO H. M. SHEER COMPANY, OF QUINCY, ILLINOIS, A CORPORATION OF ILLINOIS.

THERMOSTATIC CONTROL FOR VALVES.

Application filed January 9, 1923. Serial No. 611,677.

*To all whom it may concern:*

Be it known that I, HENRY M. SHEER, a citizen of the United States, residing at Quincy, in the county of Adams and State of Illinois, have invented certain new and useful Improvements in Thermostatic Controls for Valves, of which the following is a specification.

My invention relates to a thermostatic control for valves. While the present valve is intended for incubators, brooders, hovers and the like, obviously it might have a still wider application, either in its present form or with slight modification to suit the particular adaptation.

This invention includes a valve-chamber, a needle-valve therefor, and thermostatic means for the automatic control of the valve. It also includes a valve, a quadrant, a thermostatic element of the wafer type, and an extension-lever extending therefrom to the quadrant with means for adjustments of the several parts.

The accompanying drawing is an elevation partly in vertical section of the invention.

The numeral 1 represents a valve-chamber, through which the oil or liquid to be controlled passes. It has the usual valve-seat 2 in the center, and a needle-valve 3 controls this passage. The needle-valve is housed in a pipe 4, the lower end 5 of which is threaded and screws into the top of the valve chamber. An expansion spring 6 presses upwardly on the hood 7 of the valve, normally lifting the valve. A stuffing-box 8 has a soft, pliable packing therein, which permits the needle-valve 3 to line itself up with the valve-seat 2.

The packing is not intended to be entirely oil-tight, and will permit the oil to pass through slowly and rise in the pipe 4, since the intention is that this pipe be long enough so that the upper end will be above the oil level of the supply tank (not shown). The stuffing-box could be made oil-tight, but it is not necessary for the present purpose.

A thermostat 9 is supported by a ball and socket joint 10 on the arm 11, and this arm is held adjustably on the pipe 4 by the set-screw 12.

An extension-lever 13 extends upwardly from the wafer, and the upper end is adjustably connected by friction with the quadrant 14. This quadrant is fulcrumed on the pin 15, and an adjusting screw 16 extends through the end 17 of the quadrant on the other side of the fulcrum, and is adapted to be adjusted to bear on the hood 7 at the upper end of the needle-valve for adjusting the initial position of the valve. A pointer 18 on this adjusting screw indicates on a dial 19 below (the numbers of which are not shown) just where to set the adjusting screw. A small adjusting screw 20 extends through the bracket 21, and bears on the lug 22 on the quadrant.

The action of the quadrant 14 is for the purpose of varying the action of the thermostat 9 on the needle-valve 3. The opening of this needle-valve will be in direct proportion to the size of burner that is being used, a large burner, for instance, consuming a greater amount of oil, will necessitate a wider opening of the valve than a small burner would, using from one-half to one-fourth as much oil. The more the extension-lever 13 is set to the right, or toward the free end of the quadrant, obviously the less movement it will impart to the valve.

The small adjusting screw 20 constitutes a stop, limiting the upward movement of the quadrant, and is set to prevent the needle-valve 3 from ever being entirely closed by the action of the thermostat 9. The expansion of the thermostat itself will, of course, be the same at a given degree of heat, regardless of the size burner that is being used. It will readily be seen, therefore, that the movement of the needle-valve 3 is controlled by moving the extension-lever 13 of the thermostat on the quadrant 14.

By the use of the various adjustments, the proper relation of the parts is obtained and maintained.

The valve-chamber 1 may be of any well-known standard type, so that the pipe 4 of the thermostat may be screwed into the valve-chamber after removing the hood that is usually there. This permits the use of the thermostat on devices already equipped with a hand-operated needle-valve of this type.

I claim:

1. A thermostatic control for valves including a valve-chamber, a valve-seat, a needle-valve, a thermostat, a quadrant, the latter operated by the thermostat and in position to actuate the valve, adjustable means connected with the quadrant for adjusting the initial position of the valve, and adjustable means for limiting the movement of the quadrant in one direction.

2. A thermostatic control for valves including a valve-seat, a valve, a pivotally mounted quadrant having outwardly extending arms, a thermostat for actuating one of said arms, the other of said arms being in position to actuate the valve, and means connected with the last mentioned arm for adjusting the initial position of the valve.

3. A thermostatic control for valves including a valve chamber, a valve seat, a needle valve, a pivotally mounted thermostat, an extension lever connected therewith, a pivotally mounted quadrant having outwardly extending arms, one of said arms in position to be engaged by the extension lever, the other of said arms in position to actuate the valve, and means connected with the last-mentioned arm for adjusting the initial position of the valve.

4. A thermostatic control for valves including a valve-chamber, a valve-seat, a needle-valve, a spring for moving the needle-valve in one direction, a quadrant having one end extending in proximity to an end of the needle-valve, an adjusting screw extending through said end and in position to engage the needle-valve, a thermostat, and an extension-lever extending therefrom to, and adjustably connected with, the quadrant.

5. In a thermostatic control for valves, the combination with a valve-chamber having a valve-seat therein, a pipe extending therefrom, and having a stuffing-box therein, a needle-valve extending through, and guided by, the stuffing-box in position to control the valve-seat, a quadrant pivotally supported by the pipe, an adjusting-screw extending through one end of the quadrant in position to engage and be engaged by one end of the needle-valve, an arm adjustably connected with the pipe, a thermostat, a ball and socket connection between the thermostat and the arm, and an extension-lever extending from the thermostat to, and movably connected with, the quadrant.

In testimony whereof I affix my signature.

HENRY M. SHEER.